(12) United States Patent
Hashimoto (10) Patent No.: US 11,690,370 B2
(45) Date of Patent: *Jul. 4, 2023

(54) ANIMAL CAPTURING NET

(71) Applicant: Tomoya Hashimoto, Matsubara (JP)

(72) Inventor: Tomoya Hashimoto, Matsubara (JP)

(73) Assignee: Tomoya Hashimoto, Osaka (JP)

( * ) Notice: Subject to any disclaimer, the term of this patent is extended or adjusted under 35 U.S.C. 154(b) by 113 days.

This patent is subject to a terminal disclaimer.

(21) Appl. No.: 16/512,582

(22) Filed: Jul. 16, 2019

(65) Prior Publication Data

US 2020/0196590 A1 Jun. 25, 2020

(30) Foreign Application Priority Data

Dec. 20, 2018 (JP) .................................. 2018-238049

(51) Int. Cl.
*A01M 23/00* (2006.01)

(52) U.S. Cl.
CPC .................................. *A01M 23/00* (2013.01)

(58) Field of Classification Search
CPC ...... A01M 23/00; A01M 31/00; A01M 3/002; A01K 15/00; A01K 15/04; A01K 77/00; A01K 74/00
USPC ......................................................... 43/7, 58
See application file for complete search history.

(56) References Cited

U.S. PATENT DOCUMENTS

| | | | | |
|---|---|---|---|---|
| 2,457,922 A | * | 1/1949 | Robinson | A01K 77/00 43/12 |
| 3,318,035 A | * | 5/1967 | Hovland | A01K 77/00 43/12 |
| 3,803,743 A | * | 4/1974 | Nalepka | A01K 97/18 43/4 |
| 4,215,887 A | * | 8/1980 | Boots | E01H 1/1206 294/1.4 |
| 5,605,003 A | * | 2/1997 | Krc | A01K 77/00 43/12 |
| 7,036,263 B2 | | 5/2006 | Yang et al. | |
| 8,857,098 B2 | * | 10/2014 | Marks | A01K 77/00 43/12 |

(Continued)

FOREIGN PATENT DOCUMENTS

GB 419733 A * 11/1934 ............ A01M 3/002
JP 11262 C1 11/1906

(Continued)

OTHER PUBLICATIONS

"Fish." Merriam-Webster.com Dictionary, Merriam-Webster, https://www.merriam-webster.com/dictionary/fish. Accessed Aug. 16, 2021. (Year: 2021).*

(Continued)

*Primary Examiner* — Peter M Poon
*Assistant Examiner* — Carly W. Lynch
(74) *Attorney, Agent, or Firm* — WHDA, LLP (57) ABSTRACT

An animal capturing net having an upper opening portion, a lower bottom portion, and a prescribed depth that separates the opening portion and bottom portion, and a frame that is coupled with the net along the opening edge portion of the net, the frame includes a set of two operating frames, the operating frame includes a gripping portion, and a coupling portion that extends from the gripping portion and couples with the opening edge portion of the net.

16 Claims, 4 Drawing Sheets

(56) References Cited

U.S. PATENT DOCUMENTS

2015/0113852 A1* 4/2015 Kudner .................. A01K 77/00
43/11

FOREIGN PATENT DOCUMENTS

| JP | S35-26765 Y2 | 10/1960 | | |
|---|---|---|---|---|
| JP | H-09-172937 | 7/1997 | | |
| JP | H09172937 A | * 7/1997 | ............ | A01K 74/00 |
| JP | H10-234285 A | 9/1998 | | |
| JP | 2003-125697 A | 5/2003 | | |
| JP | 2007-236267 | 9/2007 | | |
| JP | 2007236267 A | * 9/2007 | ............ | A01M 3/00 |
| KR | 20150028699 A | * 3/2015 | ............ | A01K 77/00 |

OTHER PUBLICATIONS

Final Office Action dated Jan. 28, 2022, issued in U.S. Appl. No. 17/002,595. (8 pages).
International Search Report dated Mar. 3, 2020, issued in International Application No. PCT/JP2019/049242 237 (counterpart to U.S. Appl. No. 17/002,595). (2 pages).
Non-final Office Action dated Oct. 13, 2021, issued in U.S. Appl. No. 17/002,595. (14 pages).

* cited by examiner

ANIMAL CAPTURING NET

TECHNICAL FIELD

The present invention relates to an animal capturing net using which it is possible to capture dogs or cats easily.

RELATED ART

In a veterinary hospital or a beauty parlor for pets, before carrying out the work of treatment or hair trimming, or the like, it is necessary to capture the cat or dog that is running about. At this time, it is extremely common that the worker gets scratches on the arms or face because of the cat or dog becoming wild and scratching or biting the worker, Therefore, an animal capturing net is desired that can capture wildly running cats or dogs safely and easily.

For example, if an attempt is made to capture a cat using a capturing machine, some cats will be guarded and will not enter the machine making catching the animal difficult, Even when an accustomed pet owner tries to catch the pet and put it in a carrying case or a laundry net, or the like, the animal refuses and the pet owner gets injured. In the case of landing nets for catching fish, although it is possible to put the net over a cat from above, the cat becomes wild thereafter and the person looking after the pet gets injured while trying to capture it. There is danger even when cutting the nails.

Because of such circumstances, there is the danger that veterinary doctors and persons helping in that medical examination are injured by cats on a daily basis. Even a household cat frequently behaves extremely wild. In the case of stray cats, it is still worse. It is not possible to catch an animal with something like a laundry net. Cats in particular are dangerous as they have mouths with sharp teeth and four limbs with sharp nails, and it is difficult to carry out examination unless attention is paid to all these.

Although leather gloves are sometimes worn to avoid getting injuries, restraining is not easy because of the thickness of the gloves. Even the examination by a veterinary doctor cannot be made if leather gloves are worn. Even restraining is not possible with the weak strength of older people and women. Therefore it is not possible to protect hands or arms which get bitten or scratched. Further, using two restraining persons, sometimes the front limbs are restrained by one restraining person and the rear limbs are restrained by another restraining person, at the time of keeping pressed or pulling, depending on the respective strengths, accidents of dislocation can be caused. Therefore, examination of stray cats is frequently refused.

As prior art related to animal capturing nets, the present applicant is aware of Patent Documents 1 and 2 given below.

REFERENCE DOCUMENTS OF CONVENTIONAL ART

Patent Documents

[Patent Document 1] Japanese Unexamined Patent Application Publication No. H09-172937

[Patent Document 2] Japanese Unexamined Patent Application Publication No. 2007-236267

The above Patent Document 1 has the following descriptions.

A capturing tool that captures by covering the target at the front by a net that is widened by stretching and extending by rotating towards the front from above the head.

(0023)

Figure 1:
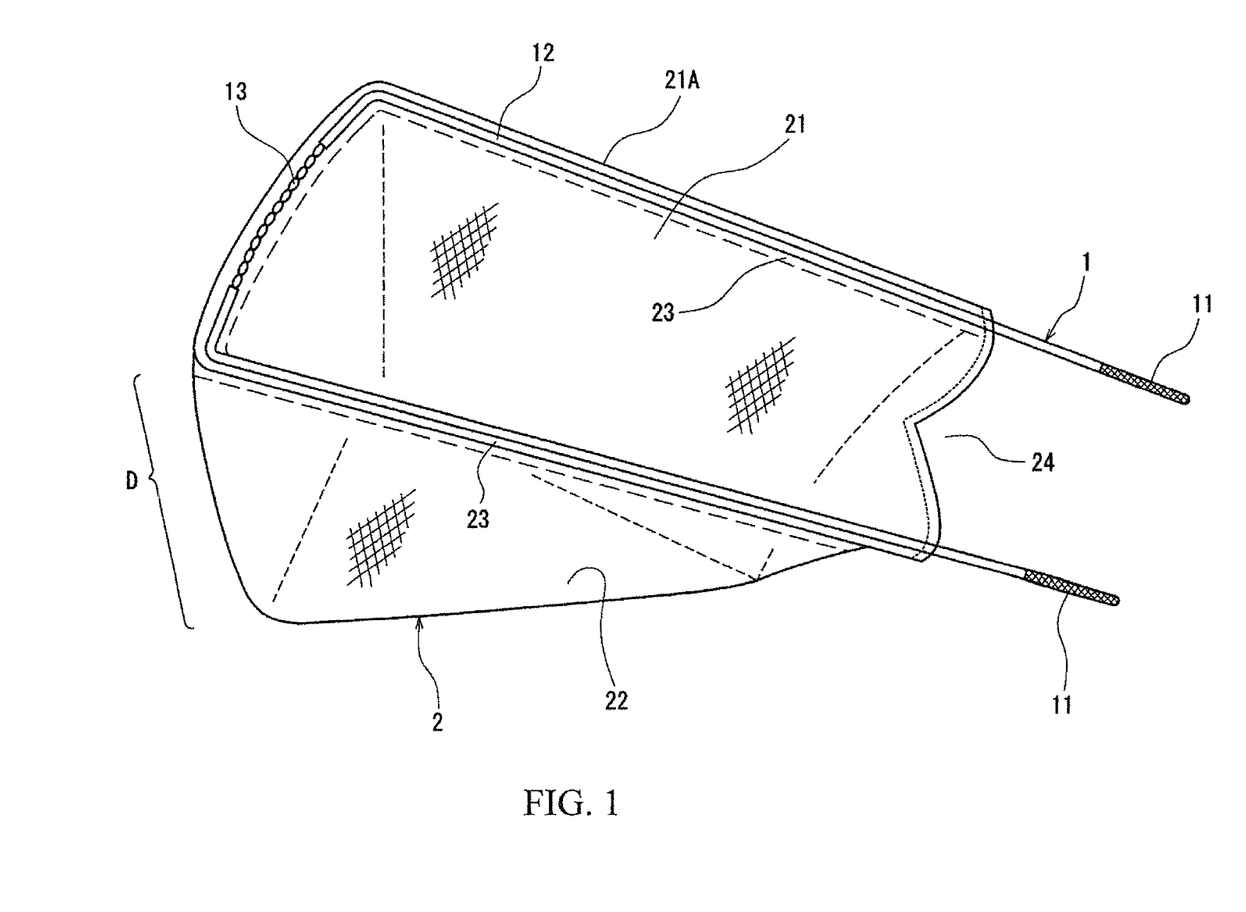
FIG. 1 is a perspective view diagram showing a preferred embodiment of the present invention.

The present invention is explained in the following with reference to the drawings. FIG. 1 is an outline diagram of the capturing tool of the present invention. Sliding tools 7 provided on both sides of a triangular net 1 are converged and stored in the rail 2. The metal plate 4 has holes for adjusting the angle of the rail, four such holes are provided, and this is a figure showing as an example the stretching and extending the net by 60 degrees. The handle 3 is extended and held in the condition in which the net is converged and stored inside the rail 2, and the net is stretched and extended at 60 degrees towards the front by the centrifugal force of the weight 6 at the tip of the net 2 by rotating the capturing tool from the rear to the front above the head.

(0030)

The capturing tool prepared in this manner is set to an angle of 90 degrees, the sliding tool is stored in the rail groove towards the handle, the handle is extended and held with both hands, the net gets beautifully widened when the handle is rotated from the rear above the head towards the front, and covered the person at the front. . . .

The above Patent Document 2 has the following descriptions.

A capturing tool having a mechanism for opening and closing the opening of the net.

(0022)

Said handheld type capturing tool 1 is provided with, a net driving means 12 that supplies drive force for automatically changing the shape of said net 3 from the open state of said opening 4 to the closed state, and an operating member 13 that makes it possible to control said net driving means 12 at the rear end portion 2a of said stick 2.

(0024)

In the present embodiment, as said net driving means 12 has been provided a coil type tension spring that always applies a restoring force to said net 3 to the closed state of said opening 4. In concrete terms, inside the hollow of said stick 2 has been inserted as said operating member an operating rod 14 that is movable in the front and back direction. The front end portion 14a of this operating rod 14 is coupled with the central portion in the length direction of said movable frame member 7. On the other hand, the rear end portion 14b of said operating rod 14 is positioned more towards the front than the rear end portion 2b of said stick 2. Further, said tension spring 12 has been placed between a plug bolt 17 that closes the rear end opening of the grip pipe 15 forming the rear end of said stick 2 and said rear end portion 14b of said operating rod 14. This tension spring 12 is constantly pressing said operating rod 14 towards the rear of said stick 2. As a result, said operating rod 14 is normally held at a position where said movable frame member 7 is abutting against said extended portion 9 of said fixed frame member 6. Therefore, under normal conditions, said opening 4 of said net 3 is held in the fully closed state due to the pressing force of said tension spring 12.

DISCLOSURE OF THE INVENTION

Problem(s) to be Solved by the Invention

The technology of the above Patent Document 1 is one in which a net that is stretched and extended by rotating the capturing tool from above the head to the front covers the animal at the front thereby capturing the animal. In order to realize this, a complicated structure is required such as a sliding member that makes the rail slide, or a weight, or the like. Once the net is stretched and extended, the operation of returning it to the original state is required by hauling in the net. Since the net cannot be used unless it is returned to the original state, when capturing fails, it is not possible to promptly move on to the next capturing operation. In the meantime, the animal is acting wild and there is the possibility of the operator getting scratched.

The technology of the above Patent Document 2 is one having a mechanism with which it is possible to open or close the opening of the net. In order to realize this, a complicated structure becomes necessary such as inserting an operating rod inside the hollow of the stick so as to be free to move in the front and back direction, or to use a tension spring that constantly pushes with a force to restore the open net to the closed state, or the like.

The present invention was made in order to solve the above problems, and was made with the following objects.

To provide an animal capturing net with a simple mechanism and with which it is possible to safely and easily capture a cat or a dog.

Means for Solving the Problem

The animal capturing net of Claim 1 adopted the following configuration to achieve the objective described above.

The animal capturing net is provided with, a net having an upper opening portion, a lower bottom portion, and a prescribed depth that separates said opening portion and bottom portion, and a frame that is coupled with said net along the opening edge portion of said net, said frame is constituted to comprise a set of two operating frames, said operating frame comprises a gripping portion, and a coupling portion that extends from said gripping portion and couples with the opening edge portion of said net, said bottom portion of said net has a shape having an apex in the direction towards the gripping portion of said operating frame, and said opening portion has a shape having a side in a direction towards the gripping portion of said operating frame.

The animal capturing net of Claim 2 adopted the following configuration in addition to the configuration disclosed in Claim 1.

Said frame has the tips of the coupling portions of the two operating frames respectively formed in the shape of hooks.

The animal capturing net of Claim 3 adopted the following configuration to achieve the objective described above.

The animal capturing net is provided with, a net having an upper opening portion, a lower bottom portion, and a prescribed depth that separates said opening portion and bottom portion, and a frame that is coupled with said net along the opening edge portion of said net, said frame is constituted to comprise a set of two operating frames, said operating frame comprises a gripping portion, and a coupling portion that extends from said gripping portion and couples with the opening edge portion of said net, and the tips of the coupling portion of the two operating frames are respectively formed in the shape of hooks.

The animal capturing net as set forth in Claim 4 adopted the following configuration in addition to the configuration as set forth in any one of Claims 1 to Claim 3.

Said frame has tips of the two operating frames coupled to each other by a string body.

Effects of the Invention

An animal capturing net described in Claim 1 is provided with a net and a frame. Said net has a prescribed depth separating the upper opening portion and the lower bottom portion. Said frame is coupled with said net along the opening edge portion of said net.

Said frame is constituted to comprise a set of two operating frames.

Said operating frame has a gripping portion and a coupling portion. Said coupling portion extends from said gripping portion, and is coupled with the opening edge portion of said net.

Therefore, the net is put from above on the animal while gripping respectively the gripping portions of the set of two operating frames with both hands, in the condition in which the coupling portion is open and the bottom portion of the net is above. In this state, it is possible to capture an animal by covering the animal with the net by closing the coupling portion by operating the operating frame.

At this time, since the shape of the opening portion of said net has a side towards the gripping portion of the operating frame, it is possible to open and close widely the coupling portion, and it is easy to put the net over an animal. Further, the shape of the bottom portion of said net has an apex in the direction towards the gripping portion of said operating frame. Because of this, the space for the animal to move becomes small when the net is put over it, the movement of the animal is restricted, and the animal can be captured smoothly.

After capturing the animal, in the state in which the opening portion is closed by bringing together the two operating frames, if the top and bottom of the net are inverted, it will be possible to restrain that animal as it is. In that state, it is possible to carry out examination, blood sample collection, body examination, nail clipping, or the like. It becomes extremely easy to carry out, for example, examinations, or the like by a veterinary doctor.

The animal capturing net of Claim 2 has said frame wherein the tips of the coupling portions of the two operating frames respectively are formed in the shape of hooks. Therefore, when the net is placed over the animal from the above and the coupling portion is closed, said hook shaped portions get caught with the legs of the animal thereby stopping the movement of the animal, whereby it is possible to wrap the animal easily with the net and to capture the animal.

An animal capturing net described in Claim 3 is provided with a net and a frame. Said net has a prescribed depth separating the upper opening portion and the lower bottom portion. Said frame is coupled with said net along the opening edge portion of said net.

Said frame is constituted to comprise a set of two operating frames.

Said operating frame has a gripping portion and a coupling portion. Said coupling portion extends from said gripping portion, and is coupled with the opening edge portion of said net.

Therefore, the net is put on the animal from above while gripping respectively the gripping portions of the set of two operating frames with both hands, in the condition in which the coupling portion is open and the bottom of the net is above. In this state, it is possible to capture an animal by covering the animal with the net by closing the coupling portion by operating the operating frame.

At this time, since the tips of the coupling portions of the two operating frames have respectively been formed with the shapes of hooks, when said frame is put over the animal from above and the coupling portion is closed, said hook-shaped portions get caught with the leg of the animal thereby stopping the movement of the animal, thereby making it possible to cover the animal easily with the net and to capture the animal.

After capturing the animal, in the state in which the opening portion is closed by bringing together the two operating frames, if the top and bottom of the net are inverted, it will be possible to restrain that animal as it is. In that state, it is possible to carry out examination, blood sample collection, body examination, nail clipping, or the like. It becomes extremely easy to carry out, for example, examinations, or the like by a veterinary doctor.

In the animal capturing net as set forth in Claim 4, in said frame, the tips of the two operating frames are coupled with each other by a string body. Because of this, when putting the net over an animal the opening shape of the net becomes stable along the string body, and it is easy to put the net over an animal.

MODES FOR CARRYING OUT THE INVENTION

Next, the embodiments of the present invention are described in detail below.

Overall Configuration

FIG. 1 is a perspective view diagram showing a preferred embodiment of the present invention.

This animal capturing net is provided with a frame 1 and a net 2. Said net 2 comprises an upper opening portion 21, a lower bottom portion 22, and a prescribed depth D that separates said opening portion 21 and bottom portion 22. Said frame 1 is coupled with said net 2 along the opening edge portion 21A of said net 2.

Frame

Figure 2:
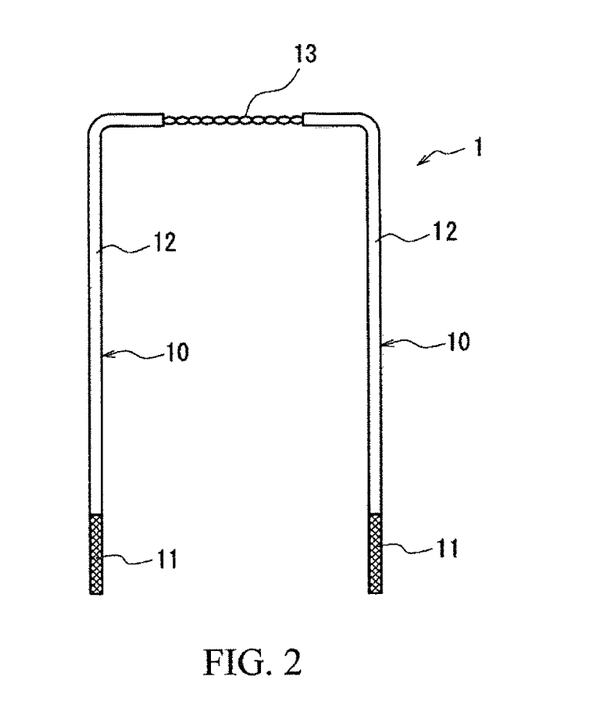
FIG. 2 is a diagram showing an example of the frame.

FIG. 2 is a diagram showing one example of said frame 1.

This frame is constituted to comprise a set of two operating frames 10.

Said operating frame 10 can be prepared, for example, using a pipe material made of a metal such as aluminum or the like.

Said operating frame 10 is provided with a gripping portion 11, and a coupling portion 12 that extends from said gripping portion 11 and is coupled with the opening edge portion 21A of said net 2.

Said gripping portion 11 is one that is operated by the user by gripping in one hand, and it is possible to carry out slipping prevention treatment in order to improve the ease of operation. Said slipping prevention treatment can be realized, for example, by covering with a grip made of rubber, or by winding a slipping prevention tape.

Said coupling portion 12 extends from said gripping portion that a user grips over a prescribed length for example towards the front of the user. In this example, the tips of the two operating frames 10 have respectively been formed by bending into hook shapes. In addition, the tips of the two operating frames 10 are mutually coupled by a string body 13. As said string body 13, in specific terms it is possible to use, for example, a chain made of a metal such as aluminum or the like.

Net

Figure 3:
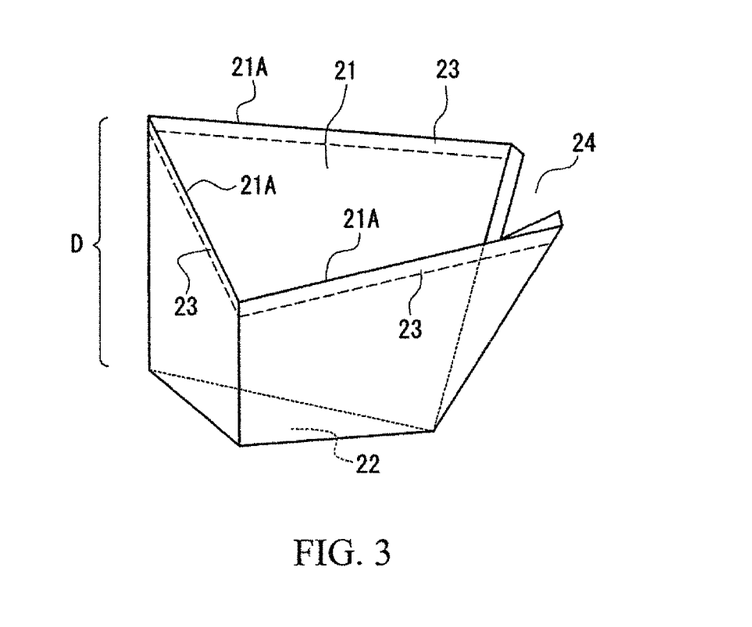
FIG. 3 is a perspective view diagram showing an example of the net.

FIG. 3 is a perspective view diagram showing an example of said net.

Figure 4:
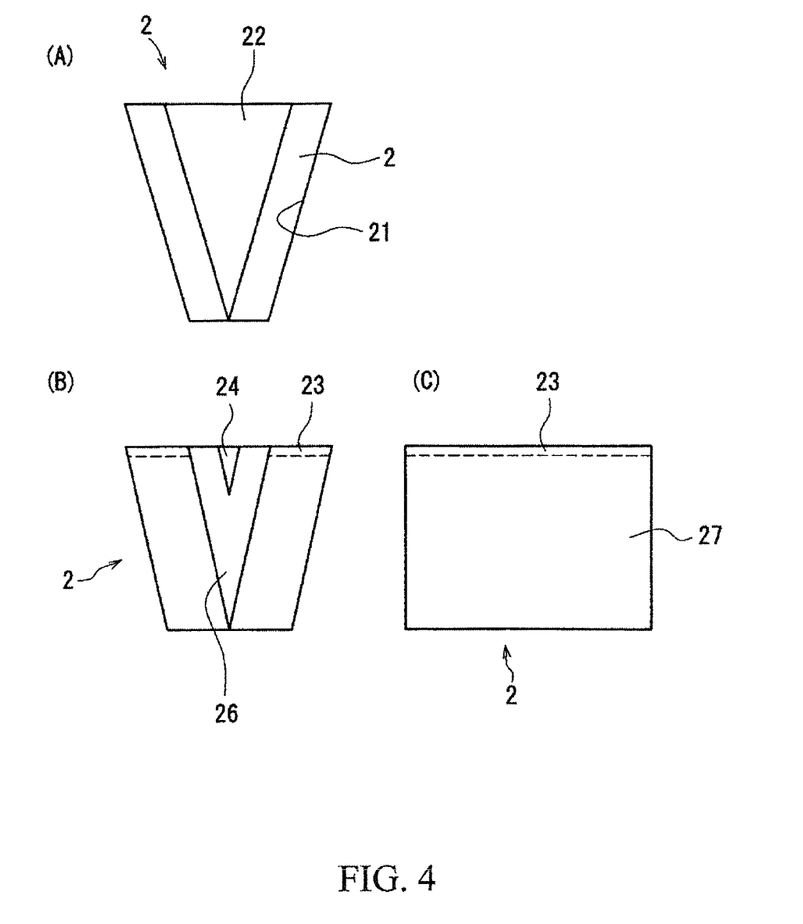
FIG. 4 is a diagram showing said net, wherein (A) is the plan view diagram, (B) is the front elevation, and (C) is a side view diagram.

FIG. 4 is a diagram showing said net, wherein (A) is the plan view diagram, (B) is the front elevation, and (C) is a side view diagram.

Figure 5:
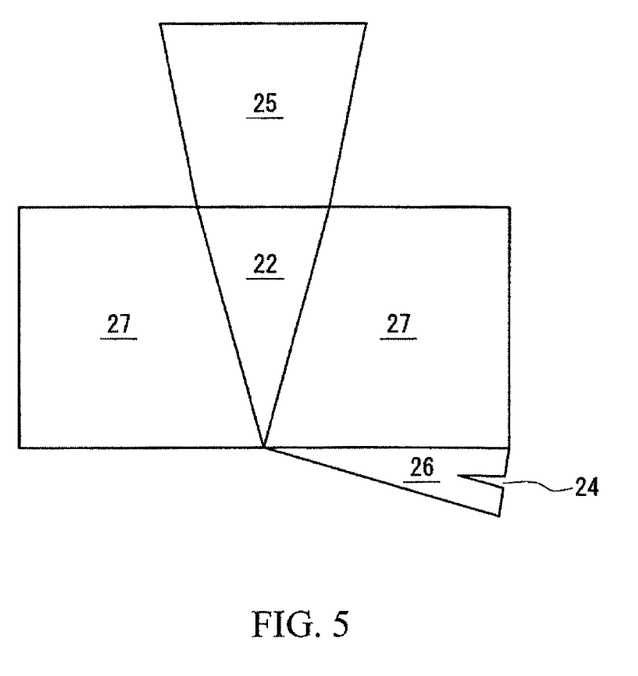
FIG. 5 is a development diagram of said net.

FIG. 5 is a development diagram of said net.

Said net 2, as has been described above, comprises an opening portion 21 and a bottom portion 22, and a prescribed depth D that separates said opening portion 21 and bottom portion 22.

In this example, said opening portion 21 exhibits a quadrilateral shape in the plan view, and said bottom portion 22 exhibits the shape of an isosceles triangle in the plan view.

In the opening edge portions 21A at the left and right and at the front of said opening portion 21 have been provided the coupling portion 12 of said frame 1 and the fold back portion 23 for passing through the string body 13. In said fold back portion 23, the frame 1 and the net 2 are coupled by passing said coupling portion 12 and the string body 13. In this state, said gripping portion 11 projects towards the near side of the left and right fold back portions 23. Therefore, in these explanations, the side at which said gripping portion projects is called the near side, and the side opposite to that side is called the front side. The two sides seen from the near side may also be called the left and right sides.

The rectangular shape of said opening portion 21 has a trapezoidal shape in which the side on the near side is shorter than the side on the front side.

The isosceles triangle of said bottom portion has an apex on the near side where the two equal sides meet.

The front-side side-surface 25 placed between the left and right side surfaces 27 has a trapezoidal shape in which the lower side is shorter than the upper side.

The near-side side-surface 26 placed between the left and right side surfaces 27 has the shape of an isosceles triangle with the apex where the two equal sides meet being placed at the bottom. In said near-side side-surface 26 has been formed a VI-shaped cut 24 forming an isosceles triangle at the top.

In other words, said bottom portion 22 has a shape that has an apex in the direction towards the gripping portion 11 of said operating frame 10. In this example, this is an isosceles triangle as described above.

Further, said opening portion 21 has a shape that has one side in the direction towards the gripping portion 11 of said operating frame 10. In addition, said opening portion 21 has a shape that has one side in the direction towards the tip of said operating frame 10. In this example, this is a trapezoidal shape as has been described above.

Method of Use

With an animal capturing net of the present embodiment, it is possible, for example, to capture an animal as follows.

The net 2 is put on the animal from above while gripping respectively the gripping portions 11 of the set of two operating frames 10 with both hands, in the condition in which the coupling portion 12 is open and the bottom portion 22 of the net is above. In that state, it is possible to capture an animal by covering the animal with the net 2 by closing the coupling portion 12 by operating the operating frame 10.

Effect of the Example

The following effect is obtained by the present embodiment.

In an animal capturing net of the present embodiment, since the shape of the opening portion 21 of said net 2 has a side towards the gripping portion 11 of the operating frame 10, it is possible to open and close widely the coupling portion 12 and it is easy to put the net 2 over an animal. Further, the shape of the bottom portion 22 of said net 2 has an apex in the direction towards the gripping portion 11 of said operating frame 10. Because of this, the space for the animal to move becomes small when the net 2 is put over the animal, the movement of the animal is restricted, and the animal can be captured smoothly.

After capturing the animal, in the state in which the opening portion is closed by bringing together the two operating frames 10, if the top and bottom of the net are inverted, it will be possible to restrain that animal as it is. In that state, it is possible to carry out examination, blood sample collection, body examination, nail clipping, or the like. It becomes extremely easy to carry out, for example, examinations or the like by a veterinary doctor.

In an animal capturing net of the present embodiment, said frame 1 has the tips of the coupling portions 12 of the two operating frames 10 respectively formed in the shape of hooks. Because of this, when the net 2 is placed over the animal from the above and the coupling portion 12 is closed, said hook shaped portions get caught with the legs of the animal thereby stopping the movement of the animal, and it is possible to wrap the animal easily with the net 2 and to capture the animal.

In an animal capturing net of the present embodiment, in said frame 1, the tips of the two operating frames 10 are coupled with each other by a string body 13. Because of this, when the net is put over an animal, the shape of the opening of the net 2 becomes stable along the string body 13, and it is easy to put the net 2 over an animal.

Further, since the string body 13 is made a chain, particularly made of a metal, it becomes easy for the opening portion 21 of the net 2 to widen and it becomes easy to cover the animal with the net 2 because of the centrifugal force acting on the string body 13 at the time the net 2 is put over the animal.

In addition, the opening portion 21 of the net 2 has a side in the direction towards the tip of said operating frame 10. In this example, this is a rectangle. Since said rectangle is forming a trapezoid with the side at the front being longer than the side that is near, the opening portion 21 on the side that is put over the animal is wide, and it is easy to put the net 2 over the animal. The rectangular shape of the opening portion 21 is a trapezoid with the side that is near is shorter than the side at the front, the near side with the gripping portion 11 has been made narrow, the slackness of the net 2 at the time of operation becomes small, and the ease of operation is good. In addition, since the side-surface 25 at the front is constituting a trapezoid with the side at the top being longer than the side at the bottom, the opening portion 21 on the side that is put over the animal is wide, and it is easy to put the net 2 over the animal. Further, by forming a V-shaped cut 24 in the side surface 26 of said near side, the cut 24 becomes wide at the time of operation, and the ease of operation is good. Further, since the near-side side-surface 26 has the shape of an isosceles triangle, and since the apex at which the two equal sides meet is placed below, the space in which the animal can move when the net 2 is put over the animal is small, the movement of the animal is restricted, and it is possible to capture the animal smoothly.

Modified Example

While particularly preferable embodiments of the present invention have been described above, the present invention is not limited to the examples provided and can be implemented through various types of modifications and the intention of the present invention is to include various modified examples of the present invention.

For example, said operating frame 10 or the string body 13 can be made not only using a metal such as aluminum or the like, but can also be formed from a plastic or the like. Further, the coupling of frame 1 and net 2 can also be done using coupling rings, or the like.

The present invention can of course be used for cats, also can be used for small sized dogs that bite or scratch, and can also be used for other types of animals.

DESCRIPTION OF REFERENCE NUMERALS

1: Frame
2: Net
0: Operating frame
1: Gripping portion
2: Coupling portion
3: String-shaped body
21: Opening portion
21A: Opening edge portion
22: Bottom portion
23: Fold back portion
24: Cut
25: Front side-surface
26: Near-side side-surface
27: Left and right side-surfaces
D: Depth

What is claimed is:

1. An animal capturing net, comprising:
a net having an upper opening portion, a lower bottom portion, and a depth that separates said opening portion and said bottom portion; and
a frame that is coupled with said net along an opening edge portion of said net at the upper opening portion, said frame including two operating frames, each of said operating frames comprises a gripping portion and a coupling portion that extends from said gripping portion and couples with the opening edge portion of said net,
wherein said bottom portion of said net has a closed end,
wherein said opening portion has a shape having a side in a direction towards the gripping portion of said operating frame,
wherein said frame has tips of the two operating frames coupled to each other by a flexible string body therebetween such that the two operating frames are movable toward and away horizontally and vertically from one another by manually moving the gripping portions toward and away horizontally and vertically from each other so as to change the shape or position of said opening portion of the net, wherein said depth that separates said opening portion and said bottom portion, includes a) a near-side side-surface of the net, adjacent the gripper portion, that extends from the opening portion to said bottom portion, b) a front-side side-surface, near the tips of the two operating frames, that extends from the opening portion to said bottom portion, and c) two lateral-side side-surfaces that extend downwardly from respective ones of said two operating frames to said bottom portion, wherein said near-side side-surface has an isosceles triangle shape with an apex at which two equal sides of said isosceles triangle shape meet, the apex being at a bottom of said near-side side-surface, and wherein said bottom portion has another isosceles triangle shape with another apex at which two equal sides of said another isosceles triangle shape meet, said another apex being connected to the apex of said near-side side-surface, a side of said another isosceles triangle connected between said two equal sides being connected to a bottom of said front-side side-surface.

2. The animal capturing net as set forth in claim 1, wherein said tips are part of the coupling portions of the two operating frames and respectively formed in the shape of hooks.

3. The animal capturing net as set forth in claim 1, wherein said two operating frames are also angularly movable relatively to one another such that the shape of said opening portion of the net can be changed by changing the relative angular positions of said two operating frames.

4. The animal capturing net as set forth in claim 1, wherein the gripping portion of each of said operating frames extends axially aligned with said respective coupling portion.

5. The animal capturing net as set forth in claim 1, wherein each of said operating frames includes a substantially straight rod member extending from a front side, near the tips of the two operating frames, to a near side, adjacent the gripper portion, of the net.

6. The animal capturing net as set forth in claim 5, wherein the gripping portion of each of said operating frames extends with said respective coupling portion.

7. The animal capturing net as set forth in claim 1, wherein the upper opening portion of the net is formed substantially trapezoidal with a near side, adjacent the gripper portion, being shorter than a front side, near the tips of the two operating frames, of the net.

8. The animal capturing net as set forth in claim 1, wherein said two operating frames being movable toward and away horizontally and vertically from one another includes that the two operating frames are flexibly connected together by the string body with the frames being freely laterally movable toward and away from one another by manually laterally moving the gripping portions toward and away from each other in a direction transverse to a respective length of each of said operating frames, between a first laterally displaced position in which the two operating frames are laterally separated from one another and the net is expanded and the opening portion is opened between the two operating frames and a second laterally abutting position in which the two operating frames laterally abut alongside one another and the net is slackened and the opening portion is closed between said two operating frames.

9. The animal capturing net as set forth in claim 1, wherein said bottom portion of the net has no objects connected thereto such as to be freely placed over a tooth-and-nailed land animal without influence of objects connected thereto.

10. An animal capturing net, comprising:

a net having an upper opening portion, a lower bottom portion, and a prescribed depth that separates said opening portion and said bottom portion; and a frame that is coupled with said net along an opening edge portion of said net, said frame is constituted to comprise a set of two operating frames, each of said operating frames comprises a gripping portion and a coupling portion that extends from said gripping portion and couples with the opening edge portion of said net, wherein tips of the coupling portion of the two operating frames are respectively formed in the shape of hooks, wherein said tips are coupled to each other by a flexible string body such that the two operating frames are movable toward and away horizontally and vertically from one another by manually moving the gripping portions toward and away from each so as to change the shape or position of said opening portion of the net, wherein said prescribed depth that separates said opening portion and said bottom portion, includes a) a near-side side-surface of the net, adjacent the gripper portion, that extends from the opening portion to said bottom portion, b) a front-side side-surface, near the tips of the two operating frames, that extends from the opening portion to said bottom portion, and c) two lateral-side side-surfaces that extend downwardly from respective ones of said two operating frames to said bottom portion, wherein said near-side side-surface has an isosceles triangle shape with an apex at which two equal sides of said isosceles triangle shape meet, the apex being at a bottom of said near-side side-surface, and wherein said bottom portion has another isosceles triangle shape with another apex at which two equal sides of said another isosceles triangle shape meet, said another apex being connected to the apex of said near-side side-surface, a side of said another isosceles triangle connected between said two equal sides being connected to a bottom of said front-side side-surface.

11. The animal capturing net as set forth in claim 10, wherein said two operating frames are also angularly movable relatively to one another such that the shape of said opening portion of the net can be changed by changing the relative angular positions of said two operating frames.

12. The animal capturing net as set forth in claim 10, wherein the gripping portion of each of said operating frames extends axially aligned with said respective coupling portion.

13. The animal capturing net as set forth in claim 10, wherein each of said operating frames includes a substantially straight rod member extending from a front side, near the tips of the two operating frames, to a near side, adjacent the gripper portion, of the net.

14. The animal capturing net as set forth in claim 10, wherein the upper opening portion of the net is formed substantially trapezoidal with a near side, adjacent the gripper portion, being shorter than a front side, near the tips of the two operating frames, of the net.

15. The animal capturing net as set forth in claim 10, wherein said two operating frames being movable toward and away horizontally and vertically from one another includes that the two operating frames are flexibly connected together by the string body with the frames being freely laterally movable toward and away from one another by manually laterally moving the gripping portions toward and away from each other in a direction transverse to a respective length of each of said operating frames, between a first laterally displaced position in which the two operating frames are laterally separated from one another and the net is expanded and the opening portion is opened between the two operating frames and a second laterally abutting position in which the two operating frames laterally abut alongside one another and the net is slackened and the opening portion is closed between said two operating frames.

16. An animal capturing net comprising:
   a net having an upper opening portion, a lower bottom portion, and a depth that separates said opening portion and said bottom portion; and
   a frame that is coupled with said net along an opening edge portion of said net at the upper opening portion, said frame including two operating frames, each of said operating frames comprises a gripping portion and a coupling portion that extends from said gripping portion and couples with the opening edge portion of said net,
   wherein said bottom portion of said net has a closed end,
   wherein said opening portion has a shape having a side in a direction towards the gripping portion of said operating frame,
   wherein said frame has tips of the two operating frames coupled to each other by a flexible string body therebetween such that the two operating frames are movable toward and away horizontally and vertically from one another by manually moving the gripping portions toward and away horizontally and vertically from each other so as to change the shape or position of said opening portion of the net,
   wherein said depth that separates said opening portion and said bottom portion, includes a) a near-side side-surface of the net, adjacent the gripper portion, that extends from the opening portion to said bottom portion, b) a front-side side-surface, near the tips of the two operating frames, that extends from the opening portion to said bottom portion, and c) two lateral-side side-surfaces that extend downwardly from respective ones of said two operating frames to said bottom portion,
   wherein said near-side side-surface of the net, adjacent the gripper portion, has a substantially triangular shape with an apex at a bottom of said near-side side-surface, and
   wherein said bottom portion has another substantially triangular shape with another apex at which two sides of said another substantially triangular shape meet, said another apex being connected to the apex of said near-side side-surface, a side of said another substantially triangular shape connected between said two sides being connected to a bottom of said front-side side-surface.

* * * * *